US005548275A

United States Patent [19]

[11] Patent Number: 5,548,275

[45] Date of Patent: Aug. 20, 1996

Shambayati et al.

[54] ALARM SYSTEM FOR ENCLOSING AND PROTECTING AN AREA

[76] Inventors: Ali Shambayati, 1616 W. Lawrence Rd., Phoenix, Ariz. 85015; Mohammad R. Ehasani, 5630 E. Via Arbolada, Tucson, Ariz. 85715; Ali R. Ehsani, 4117 E. Bellevue St. #4, Tucson, Ariz. 85712

[21] Appl. No.: 376,783

[22] Filed: Jan. 23, 1995

[51] Int. Cl.$^6$ .......... G03B 23/20

[52] U.S. Cl. .......... 340/573; 340/940; 340/544

[58] Field of Search .......... 340/573, 940, 340/933, 540, 544, 557, 556, 541

[56] References Cited

U.S. PATENT DOCUMENTS

| | | | |
|---|---|---|---|
| 3,319,222 | 5/1967 | Grant | 340/940 |
| 3,335,285 | 8/1967 | Gally, Jr. et al. | 340/557 |
| 3,623,057 | 11/1971 | Hedin et al. | 340/557 |
| 3,688,298 | 8/1972 | Miller et al. | 340/557 |
| 3,711,846 | 1/1973 | Schlisser et al. | 340/557 |
| 3,810,146 | 5/1974 | Lieb | 340/541 |
| 3,898,639 | 8/1975 | Muncheryan | 340/557 |
| 3,950,725 | 4/1976 | Kitajima | 340/940 |
| 3,953,843 | 4/1976 | Codina | 340/556 |
| 4,047,166 | 9/1977 | Miller | 340/940 |
| 4,091,370 | 5/1978 | Swanda | 340/940 |
| 4,701,751 | 10/1987 | Sackett | 340/556 |
| 4,853,691 | 8/1989 | Kolbatz | 340/566 |
| 4,862,163 | 8/1989 | Sobut | 340/940 |
| 4,901,334 | 2/1990 | Gibson | 340/940 |
| 4,910,498 | 3/1990 | Feher | 340/556 |

*Primary Examiner*—Brent A. Swarthout
*Assistant Examiner*—Albert K. Wong
*Attorney, Agent, or Firm*—John R. Flanagan

[57] ABSTRACT

A protective alarm system for encompassing an area to be protected, such as a swimming pool, includes an enclosure arrangement having at least one and preferably a plurality of flexible hoses that are filled with fluid and substantially enclose or surround the perimeter of the area to be protected. The protective alarm system also includes a detector mechanism connected to the enclosure arrangement and capable of detecting change in the fluid pressure caused by transfer of the weight of a person to compress the hose by stepping thereon. The protective alarm system further includes an alarm device connected to the detector mechanism and operable to generate an alarm signal in response to detection by the detector mechanism of a change in the fluid pressure in the hoses.

13 Claims, 5 Drawing Sheets

ALARM SYSTEM FOR ENCLOSING AND PROTECTING AN AREA

BACKGROUND OF THE INVENTION

1. Field of the Invention

The present invention generally relates to alarm systems and, more particularly, is concerned with an alarm system for enclosing and protecting an area, such as a swimming pool.

2. Description of the Prior Art

Each year, a great number of children, or adults who sleep-walk, die by drowning or are seriously injured in swimming pool accidents. These accidents often result in significant medical expenses. Consequently, some states have passed laws requiring swimming pools to be protected by an enclosed fence. These fences, which must satisfy specific requirements in terms of height and opening dimensions, are expensive and often unattractive. Few homeowners voluntarily comply with these laws. A need therefore exists for a more economical solution to this problem.

Over the years, various systems have been developed to provide for the detection of objects or people on the premises of homes and other locations. A common element in these systems involve the use of lasers or infrared light with reflecting devices such as mirrors that set off an alarm whenever an object or person interrupts the normal course of the laser or infrared beam. Reflecting devices are used to angle and pass the beam in various directions such as around the perimeter of a swimming pool or building. Representative examples of this type of system are disclosed in U.S. Pat. No. 3,335,285 to Gally, Jr. et al., U.S. Pat. No. 3,623,057 to Hedin et al., U.S. Pat. No. 3,688,298 to Miller et al., U.S. Pat. No. 3,711,846 to Schlisser et al., U.S. Pat. No. 3,898,639 to Muncheryan, and U.S. Pat. No. 4,910,498 to Feher. While the above mentioned prior art does address the issue of swimming pool safety without requiring fences, the solutions are technically advanced and too expensive for widespread use by the general public at their homes.

Consequently, a need remains for a simple, low-cost solution to ensure a safe swimming pool environment for children and adult sleep-walkers.

SUMMARY OF THE INVENTION

The present invention provides an alarm system for encompassing an area to be protected, such as a swimming pool, which is designed to satisfy the aforementioned needs. The advantage of the present invention is its simplicity and low-cost way of ensuring a safe swimming pool environment for children and adult sleep-walkers.

Accordingly, the present invention is directed to an alarm system for encompassing an area to be protected which comprises: (a) an enclosure arrangement having at least one and preferably a plurality of flexible hoses or hose modules filled with fluid and substantially enclosing or surrounding the perimeter of the area to be protected; (b) a detector mechanism connected to the enclosure arrangement and capable of detecting a change in the fluid pressure caused by transfer of the weight of a person upon the hoses by stepping thereon so as to compress the hoses; and (c) an alarm device connected to the detector mechanism and being operable to generate an alarm signal in response to detection by the detector mechanism of the change in the fluid pressure in the hoses.

The enclosure arrangement includes a plurality of modular panels arranged end-to-end and placed over and resting upon the hoses so as to cover the hoses. The panels are sufficiently wide to cause a person approaching the area surrounded by the hoses to step on at least one of the panels. The panels are sufficiently stiff to cause transfer of the weight of person through the panel to the hose in response to the person stepping on the panel.

In one embodiment of the enclosure arrangement, the hose is a plurality of relatively wide flexible modules. The hose modules are connected in series to one another by hollow couplers at opposite ends of each of the hose modules. Each hose module has a plurality of compartments connected in parallel communication with the opposite ends thereof and being partitioned to suppress generation of wave motion in the hose module where the fluid filling the module is a liquid and to ensure pressure levels will remain substantially the same within each compartment. Alternatively, the compartments of each hose module are connected in series communication with one another.

In another embodiment of the enclosure arrangement, the plurality of hoses are disposed in side-by-side relationship with one another and are spaced apart sufficiently so as to cause a person approaching the area surrounded by the hoses to step on at least one of the hoses. The enclosure arrangement also includes a plurality of holding devices attached to the plurality of hoses at longitudinally displaced locations therealong to ensure consistent spacing between the plurality of hoses.

The detecting means contains a pressure sensing device that will generate an alarm signal upon sensing an increase in pressure in the hose modules due to a person stepping thereon. In one embodiment, the pressure sensing device includes a pair of fluid-level sensors connected in communication with the fluid in the hoses. One sensor is preset at a first level condition to detect possible leaking from the hoses. The other sensor is preset at a second level condition being different from the first level condition to detect an increase in pressure due to a person stepping on one of the hoses. In another embodiment, the pressure sensing device includes an air tight chamber and a pressure sensor connected in communication therewith by a pressure sensing hole through which compressed air passes to the pressure sensor to detect an increase in pressure in the fluid caused by an increase in pressure in the fluid due to a person stepping on one of the hoses. In still another embodiment, the pressure sensing device includes first and second pairs of electrical conductor sensors disposed in a chamber connected in communication with the fluid in the hoses. One pair of electrical conductors is preset at a first level condition to detect possible leaking. The other pair of electrical conductors is preset at a second level condition being different from the first level condition to detect an increase in pressure due to a person stepping on the hoses.

In another embodiment, the detecting means includes means for distinguishing between different rates of change and different levels of the pressure of fluid in the hose. The distinguishing means includes a plate supported upright on a top surface of the liquid within a tube connected to the hose with the plate having a plurality of holes defined through a central portion thereof adapted to pass light and being solid at upper and lower end portions thereof adapted to block light. The distinguishing means also includes a pair of light emitting and light sensing devices respectively disposed on opposite sides of the plate and facing toward one another with the plate positioned therebetween such that the amount of light sensed by the light sensing device is dependent upon the position of the plate relative to the light emitting and light sensing devices and the rate of change in the amount of light sensed by the light sensing device is dependent upon the rate of change of and the level of the liquid in the tube.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
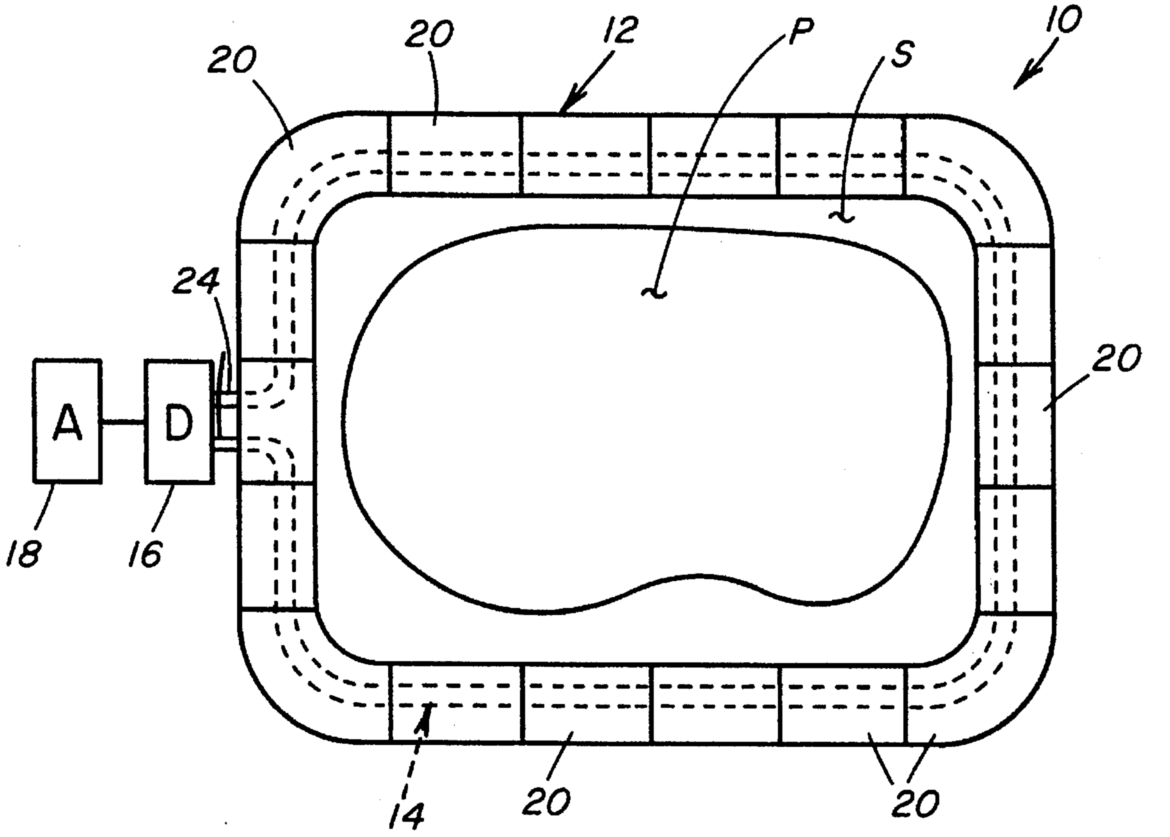
FIG. 1 is a schematic top plan view of a first embodiment of the protective alarm system of the present invention shown encompassing a swimming pool to be protected.
Figure 3:
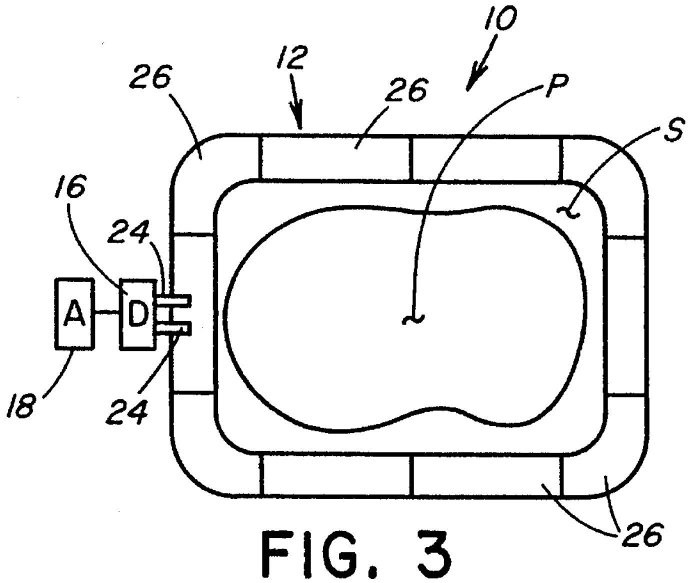
FIG. 3 is a schematic top plan view of a second embodiment of the protective alarm system of the present invention also shown encompassing a swimming pool to be protected.
Figure 4:
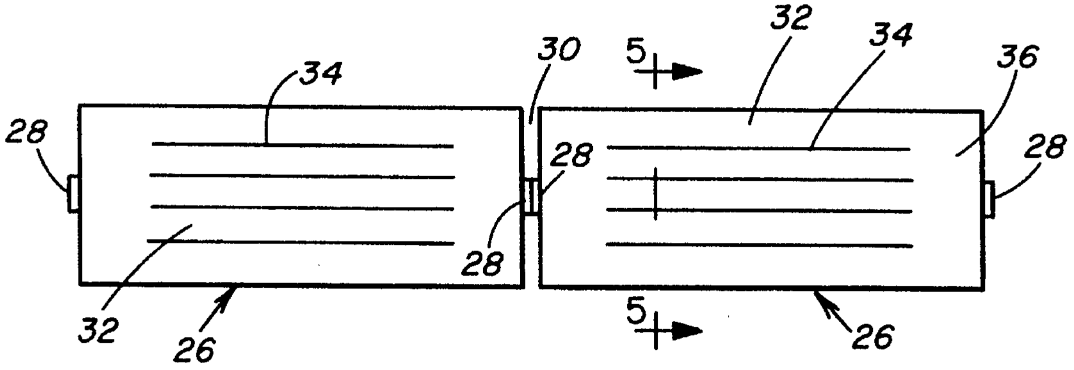
FIG. 4 is an enlarged schematic top plan view of two of the flexible hose modules making up the hose of the second embodiment of the present invention.
Figure 6:
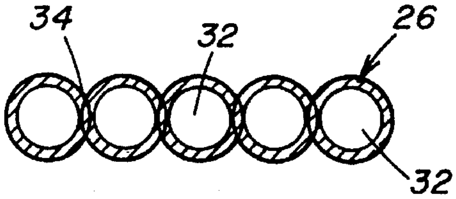
FIG. 6 is an enlarged cross-sectional view similar to that of FIG. 5 but of a second configuration of the compartments within the hose modules of the second embodiment of the flexible hose.
Figure 5:
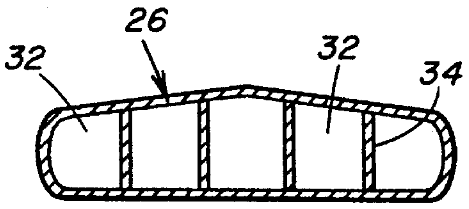
FIG. 5 is an enlarged cross-sectional view of a first configuration of the compartments within the hose modules of the second embodiment of the flexible hose taken along 5—5 of FIG. 4.
Figure 7:
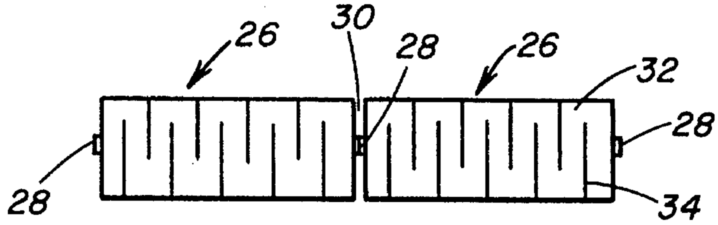
FIG. 7 is a longitudinal schematic view, but on a reduced scale compared to that of FIG. 4, of a third configuration of the compartments within hose modules of the second embodiment of the flexible hose.
Figure 8:
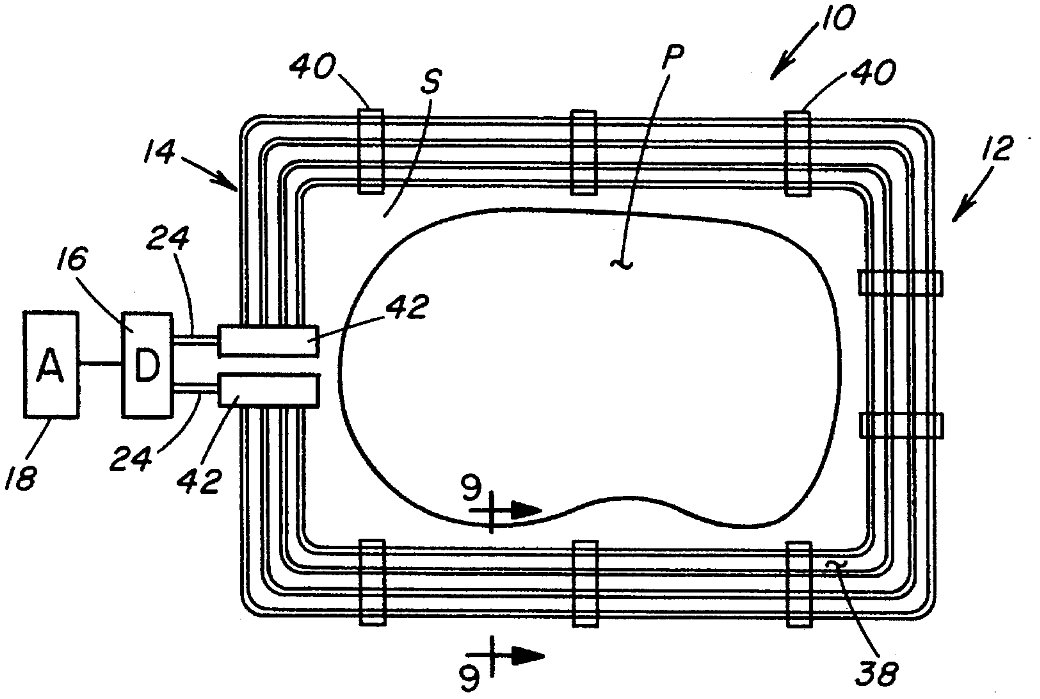
FIG. 8 is a schematic top plan view of a third embodiment of the protective alarm system of the present invention shown encompassing a swimming pool to be protected.

Referring to the drawings and particularly to FIGS. 1, 3 and 8, there is respectively illustrated three different embodiments of a protective alarm system, generally designated 10, of the present invention. Each embodiment of the protective alarm system 10 is shown encompassing an area to be protected, such as a swimming pool P, as schematically illustrated in FIGS. 1, 3 and 8.

Basically, the protective alarm system 10 includes an enclosure arrangement 12 including a hose means 14 filled with a fluid F and substantially surrounding the perimeter of the swimming pool P to be protected. The protective alarm system 10 also includes means in the form of a detector mechanism 16 connected to the enclosure arrangement 12. The detector mechanism 16 is operable to detect a change in pressure of the fluid filling the hose means 14 in response to transfer of the weight of a person (not shown) onto the hose means 14, such as by stepping thereon, and thereby transfer of the person's weight to the fluid therein by compression of the hose means 14. The protective alarm system 10 further includes means in the form of an alarm mechanism 18 connected to the detector mechanism 16 and being operable to generate a warning signal in response to the detection of the change in the fluid pressure in the hose means 14 by the detector mechanism 16 due to the person stepping on the hose means 14.

Figure 2:
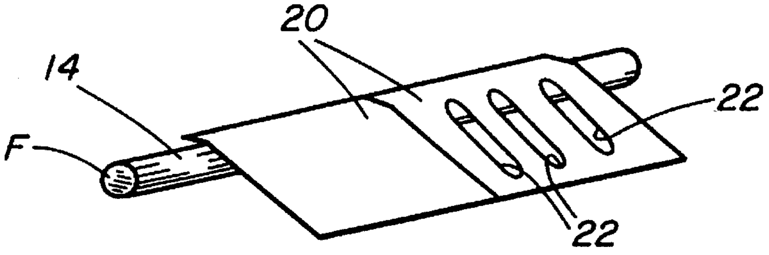
FIG. 2 is an enlarged perspective view of a section of the flexible hose and modular panels of the first embodiment of the present invention of FIG. 1.

Referring to FIGS. 1 and 2, there is illustrated the first embodiment of the protective alarm system 10 of the present invention. In the first embodiment, the hose means 14 is a single flexible hose 14 filled with the fluid F, such as air or water, and laid on a surface S of the area surrounding the pool P so as to enclose the perimeter of area to be protected. The enclosure arrangement 12 also includes a plurality of modular panels 20 arranged end-to-end and placed over and resting upon the hose 14 so as to completely cover the hose 14. The panels 20 are sufficiently wide to cause a person approaching the area surrounded by the hose 14 to step on at least one of the panels 20. Thus, the person will not be able to reach the pool P without stepping on at least one of the panels 20. The panels 20 are sufficiently stiff to cause the weight of the person to be transferred to hose 14 with a resulting increase in the pressure of the fluid in hose 14.

As seen in FIG. 1, the panels 20 are constructed as either straight or curved segments. Each panel 20 preferably has one end resting on the surface S while the other end rests on top of hose 14 to ensure that the weight of a person stepping on one of the panels 20 is transferred to hose 14. As seen in FIG. 2, the panels 20 can have a solid construction or an open-grid, mesh-like material formed by a series of slots 22 formed therein so that the panel will not transfer any downward pressure to the hose 14 caused by impact of wind or heavy rain on the panel 20. Each panel 20 is securely tied to the hose 14 by any suitable means. Also, the opposite ends of the hose 14 are connected to tubes 24 which, in turn, are connected to the detector mechanism 16.

Referring to FIGS. 3–7, there is illustrated the second embodiment of the protective alarm system 10 of the present invention. In the second embodiment, the hose means 14 is a plurality of relatively wide flexible hose modules 26. The hose modules 26 have either straight or curved configurations and are connected in series relationship to one another by hollow couplers 28 attached at opposite ends of each of the hose modules 26. The hose modules 26 are preferably coated with a fabric to provide protection against damage thereto caused by ultraviolet rays and to limit the expansion thereof by a rise in ambient temperature. Gaps 30 between two consecutive hose modules 26 are smaller than the footprint of a small child so that the child will not be able to walk between hose modules 26 without stepping thereon.

As shown in FIGS. 4–7, the hose modules 26 also have a plurality of compartments 32 partitioned therein by walls 34 to suppress wave motion in cases where hose modules 26 are filled with a liquid such as water. Compartments 32 of modules 26 define a continuous chamber 36 to ensure that the pressure levels will remain the same within each compartment 32. In a preferred embodiment shown in FIG. 5, the walls 34 are taller toward the center of hose module 26 so that the top surface thereof is sloped outward and downward in opposite directions to prevent accumulation of any rain water thereon which could cause an increase in the pressure of the fluid contained therein, thereby possibly resulting in a false signal to the alarm mechanism 18. Alternatively, in FIG. 6 the height of walls 34 are the same and the compartments 32 take the shape of circles when hose modules 26 are filled with a fluid. As shown in another alternative in FIG. 7, the walls 34 can form the compartments 32 in a serpentine arrangement.

Figure 9:
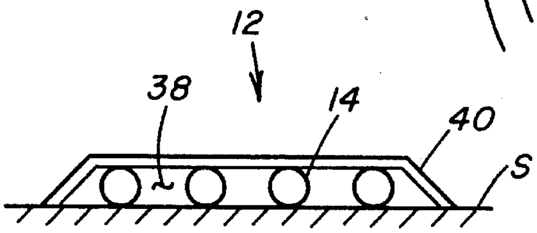
FIG. 9 is an enlarged cross-sectional view taken along line 9—9 of FIG. 8 showing a plurality of flexible hoses held in place by a holding device of the third embodiment of the system.

Referring to FIGS. 8 and 9, there is illustrated the third embodiment of the protective alarm system 10 of the present invention. In the third embodiment, the hose means 14 includes a plurality of flexible hoses 14 which are laid on the surface S with spaces 38 between them so as to make it practically impossible for a person to reach the pool P within the protected area without stepping at least once on one of hoses 14. The enclosure arrangement 12 also includes a plurality of hose holding devices 40 which ensure that the spaces 38 remain substantially the same width. The ends of hoses 14 are connected to manifolds 42 which ensure that fluid pressure remains the same in all hoses 14. Tubes 24 connect the manifolds 42 to the detector mechanism 16 which, in turn, is connected to the alarm mechanism 18. Any changes in the fluid pressure in hoses 14 are transferred to the manifolds 42 and then to the detector mechanism 16 by means of the tubes 24. A signal from the detector mechanism 16 in turn causes the alarm mechanism 18 to set off an audible sound or alarm. As was used in the first embodiment of the protective alarm system 10 of FIGS. 1 and 2, the plurality of modular stiff panels 20 can also be used to cover the plurality of hoses 12 described here, but are not shown in FIG. 8.

Figure 10:
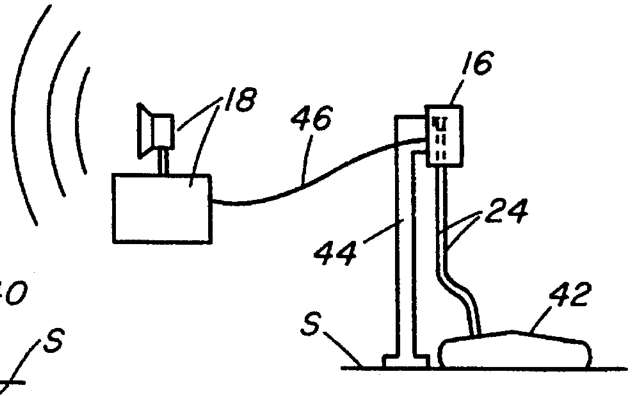
FIG. 10 is an enlarged fragmentary side elevational view of a detector mechanism and an alarm mechanism in each of the embodiments of the protective alarm system of the present invention.

Referring now to FIG. 10, there is illustrated in greater detail the detector mechanism 16 and alarm mechanism 18 of the protective alarm system 10. The detector mechanism 16 has a vertical support 44 securely connected to the ground surface S. Tubes 24 coming from the manifolds 42 connected to the ends of hoses (not shown in FIG. 10) are placed adjacent to the vertical support 44 and terminate into the detector mechanism 16. Conductor wires 46 connect the detector mechanism 16 to the alarm mechanism 18. The detector mechanism 16 contains a pressure sensor device 48 that will signal the alarm mechanism 18 upon sensing an increase in pressure in the system 10 due to a person (not shown) stepping on hose means 14.

Referring to FIGS. 11–15, there is illustrated four different embodiments of the detector mechanism 16. Any of the embodiments of the detector mechanism 16 can be employed with the hose means 14 of any of the three embodiments of the protective alarm system 10.

Figure 11:
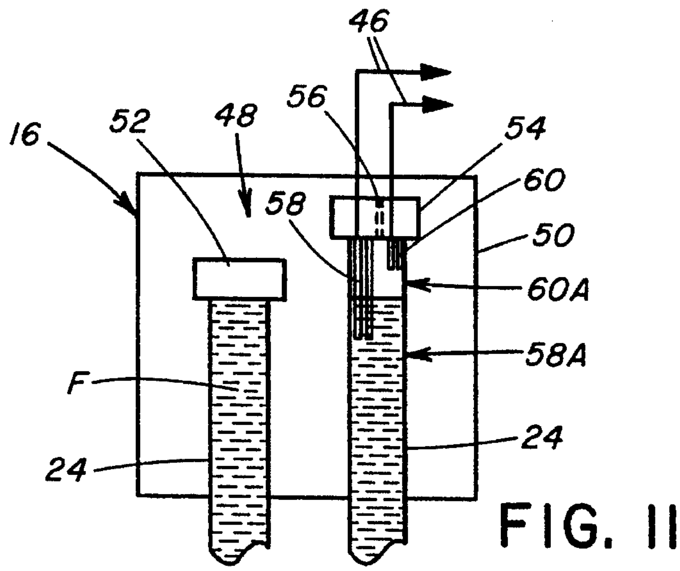
FIG. 11 is an enlarged schematic view of a first embodiment of the detector mechanism employed in the system of the present invention.

FIG. 11 illustrates a first embodiment of the detector mechanism 16 in the form of a liquid-level pressure sensoring device 48 enclosed within a detector housing 50. Hoses 14 and manifolds 42 (not shown in this figure) are filled with a liquid F until the height of liquid F in both tubes 24 rises to the top of shorter tube 24. The top end of shorter tube 24 is then closed by a cap 52. The top end of the taller tube 24 is closed by a cap 54 which includes a pressure relief passage 56, a low-liquid-level sensor 58 and a high-liquid-level sensor 60. Low-liquid-level sensor 58 detects possible leaks in the system 10 when the liquid level in taller tube 24 falls to low point 58A. High-liquid-level sensor 60 detects increases in pressure in system 10 when the liquid level in taller tube 24 rises to high point 60A. Sensors 58 and 60 upon activation send a signal via conductor wire 46 to the alarm mechanism 18, which then also sends out a warning signal.

Figure 12:
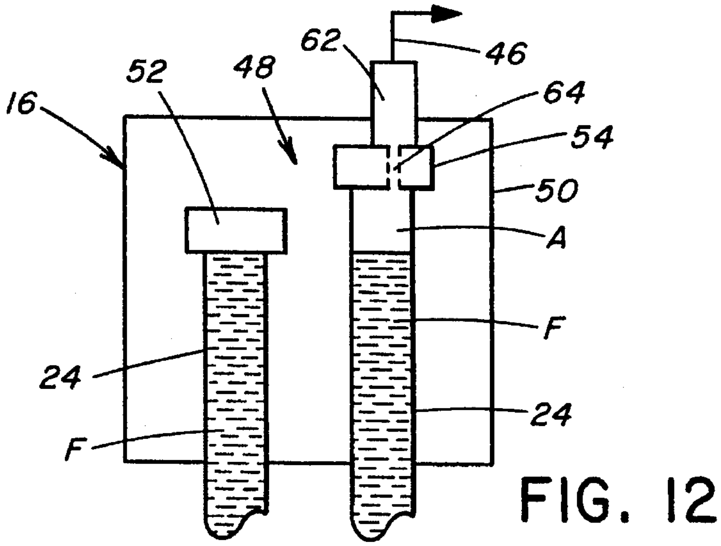
FIG. 12 is an enlarged schematic view of a second embodiment of the detector mechanism employed in the system of the present invention.

FIG. 12 illustrates a second embodiment of the detector mechanism 16 in the form of another pressure sensor device 48 which is used only when the fluid F employed in the system 10 is a liquid. Hoses 14 and manifolds 42 (not shown) are filled with liquid F until the height of liquid F in both tubes 24 rises to the top of shorter tube 24. The top end of shorter tube 24 is then closed by the cap 52. The top end of the taller tube 24 is closed by the cap 54 which includes a pressure sensor 62 and pressure sensing passage 64. After closing tubes 24 with caps 52, 54, a quantity of air A then becomes trapped between the top surface of liquid F and the pressure sensing passage 64 in taller tube 24. An increase in pressure in liquid F due to a person stepping on hoses 14 (not shown) will cause air A to compress through pressure sensing passage 64 resulting in detection by pressure sensor 62, which then sends a signal to the alarm mechanism 18. A leak in the system 10 causing a reduction in pressure of air A will also be detected by pressure sensor 62 and likewise result in a signal being sent to the alarm mechanism 18.

Figure 13:
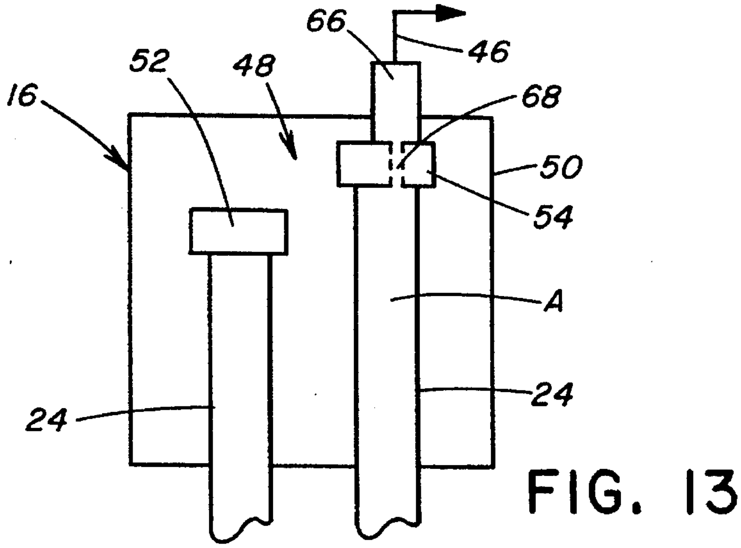
FIG. 13 is an enlarged schematic view of a third embodiment of the detector mechanism employed in the system of the present invention.

FIG. 13 illustrates a third embodiment of the detector mechanism 16 in the form of yet another pressure sensor device 48 used only when the fluid F used in the system 10 is a gas such as entrapped air A. Hoses 14 and manifolds 42 (not shown) are filled with air. The top end of shorter tube 24 is closed by the cap 52. The top end of the taller tube 24 is also closed by the cap 54 which includes a pressure sensor 66 and pressure sensing passage 68. After system 10 is made air-tight, the air therein is subjected to pressure before an air inlet valve is closed, thus pressurizing the system 10. An increase in pressure in the entrapped air A due to a person stepping on hoses 14 (not shown) will cause the air A to compress through pressure sensing passage 68 resulting in detection by pressure sensor 66, which then signals the alarm mechanism 18. A leak in the system 10 causing a reduction in pressure of air A will also be detected by pressure sensor 66 and likewise result in a signal to the alarm mechanism 18.

Finally, the outputs of the respective pressure sensor devices 48 of the embodiments of FIGS. 11–13 are high-pass filtered to differentiate between pressure changes due to ambient air temperature variations and those changes caused by a person stepping on hoses 14.

Figure 14:
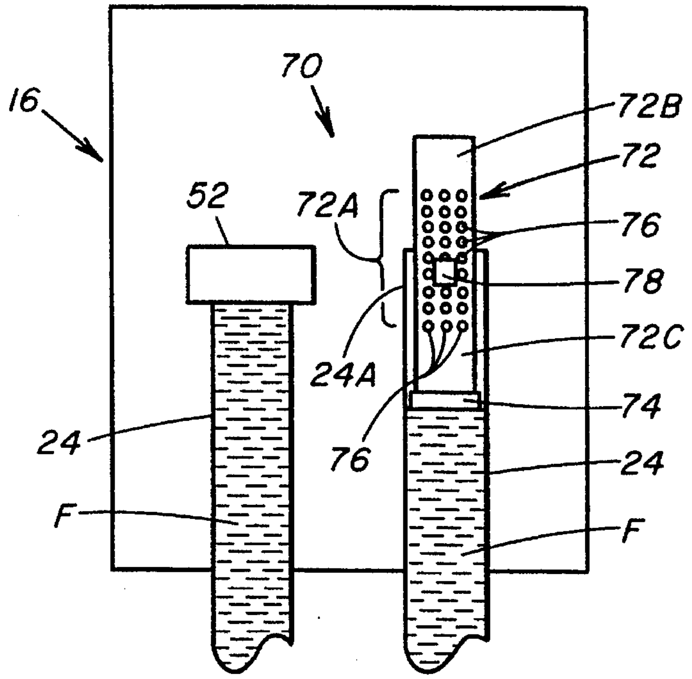
FIG. 14 is an enlarged schematic view of a fourth embodiment of the detector mechanism employed in the system of the present invention.
Figure 15:
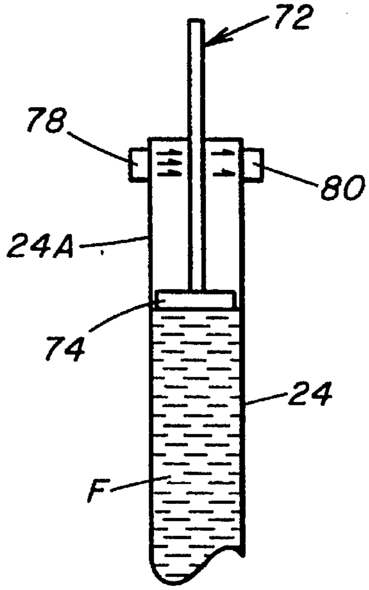
FIG. 15 is a side elevational view of the detector mechanism of FIG. 14.

FIGS. 14 and 15 illustrate a fourth embodiment of the detector mechanism 16 in the form of another pressure sensor device 70 which is used only when the fluid F employed in the system 10 is a liquid. Hoses 14 and manifolds 42 (not shown) are filled with liquid F until the height of liquid F in both tubes 24 rises to the top of shorter tube 24. The top end of shorter tube 24 is then closed by the cap 52. The top end 24A of the taller tube 24 is left open and is transparent.

The detector mechanism 16 of the fourth embodiment includes a flat plate 72 mounted upright on a float element 74 which, in turn, is supported upon the top surface of the liquid F within the top open end 24A of the taller tube 24. The flat plate 72 has a central portion 72A with a plurality of holes 76 defined through it in a matrix of vertical columns and horizontal rows. The detector mechanism 16 also includes a light emitting diode or device 78 and a light sensing device 80 respectively mounted to the top end 24A of the taller tube 24 on opposite sides thereof facing opposite sides of the upright plate 72. In other words, the light emitting and sensing devices 78, 80 face each other through the holes 76 in the plate 72 and are disposed 180° apart from one another with the flat plate 72 disposed substantially perpendicular to the line of sight of the devices 78, 80. The holes 76 in the plate 72 are spaced at equal distances from one another and are smaller in size than the active area of the light emitting and sensing devices 78, 80. The distances between the holes 76 is short enough such that at least part of the light generated by the light emitting device 78 is received by the light sensing device 80 at all times. Thus, the flat plate 72 can partially pass and partially block the light generated by the light emitting device 78, depending upon the positions of the holes 76 with respect to the devices 78, 80.

The detection mechanism 16 of the fourth embodiment thus provides means for distinguishing between slow and fast rates of change in the light signal received by the light sensing device 80. A change, namely, an increase or decrease, of the liquid pressure moves the flat plate 72 and float element 74, correspondingly, up or down. The detection mechanism 16 of the fourth embodiment is thus able to distinguish between an "alarming" condition or a fast change of liquid pressure due to someone stepping on the hose means 14, which typically happens at a fast rate, and a "non-alarming" condition or a slow change of liquid pressure due to an event, such as liquid evaporation or expansion or contraction of the tube means 14, which typically happens at a slow rate. Circuitry in the alarm device 18 connected to the output of the light sensing device 80 is able to distinguish between the slow and fast rates of change in the light and thus in the liquid pressure and to ignore the changes at slow rates.

In addition to sudden or fast change of liquid pressure, an "alarming" condition is indicated by two other instances: low liquid level/pressure or high liquid level/pressure. Upper and lower end portions 72B, 72C of the flat plate 72 above and below the central portion 72A thereof contain no holes and thus will block passage of light. Thus, in these two other instances, the upper and lower end portions of the flat plate respectively block the light generated by the light emitting device 78. Therefore, no light is received by the light sensing device 80, which is then recognized as an "alarming" condition by the detection circuit.

Figure 16:
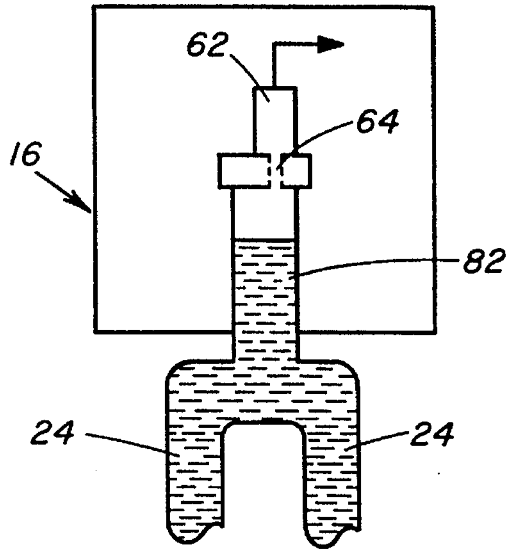
FIG. 16 is a schematic view of a modified form of components of the system associated with the second embodiment of the detector mechanism of FIG. 12.
Figure 17:
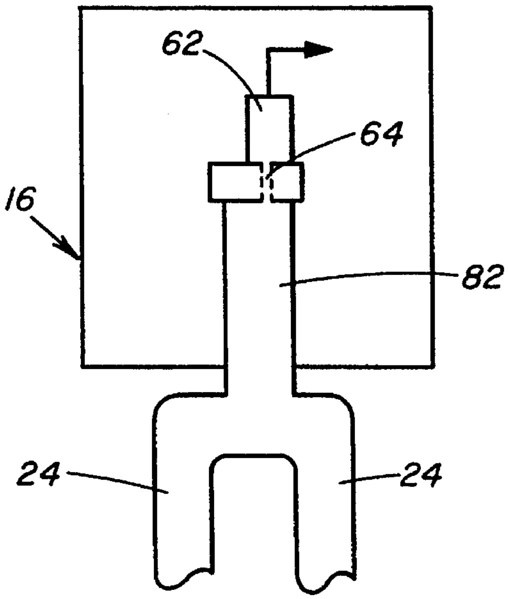
FIG. 17 is a schematic view of a modified form of components of the system associated with the third embodiment of the detector mechanism of FIG. 13.

In the respective embodiments of the detector mechanisms 16 of FIGS. 11–15, it is not necessary that the two tubes 24 interconnecting the opposite ends of the hose 14 to the detector mechanism 16 be provided as shown. In particular, the shorter of the tubes 24 need not be separately closed by the cap 52 at the detector mechanism 16. Instead, as shown in FIGS. 16 and 17, the tubes 24 can merge into a single tube 82 which then connects to the respective detector mechanism 16. The same parts of the detector mechanisms 16 of FIGS. 16 and 17 that are identical to those of FIGS. 12 and 13 are identified by the same reference numerals.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A protective alarm system for encompassing an area to be protected, said alarm system comprising:

(a) an arrangement including a plurality of flexible hose modules filled with fluid and interconnected in an end-to-end relationship with one another at opposite open ends of said hose modules such that the fluid filling each hose module communicates with the fluid filling adjacent hose modules interconnected thereto and the interconnected hose modules substantially surround a perimeter of the area to be protected so as to permit a person approaching the area surrounded by said interconnected hose modules to step thereon, each of said hose modules having means defining a plurality of compartments therein, said compartments of said each hose module extending between and being provided in communication with said opposite open ends of said each hose module and being partitioned to suppress generation of wave motion in said each hose module where said fluid filling said hose module is a liquid and to ensure pressure levels will remain substantially the same within each said compartment;

(b) means connected to said arrangement for detecting a change in pressure of said fluid filling said hose modules in response to transfer of the weight of the person stepping on at least one of said hose modules and to said fluid therein by compression of said hose module; and (c) an alarm device connected to said detecting means for generating a warning signal in response to detection of said change in said fluid pressure in said hose module by said detecting means.

2. The system of claim 1 wherein said hose modules are connected in series to one another by hollow couplers at opposite ends of each of said hose modules.

3. The system of claim 1 wherein said compartments of each said hose module are connected in series communication with one another.

4. The system of claim 1 wherein said compartments of said hose modules are generally circular in cross-sectional shape.

5. The system of claim 1 wherein said compartments of said hose modules are generally trapezoidal in cross-sectional shape.

6. A protective alarm system for encompassing an area to be protected, said alarm system comprising:

(a) an arrangement including
  (i) a plurality of flexible hoses filled with fluid and substantially surrounding a perimeter of the area to be protected, said hoses being disposed in side-by-side relationship with one another and being spaced apart so as to permit a person approaching the area surrounded by said hoses to step on at least one of said hoses, and
  (ii) a plurality of holding devices attached to said plurality of hoses at longitudinally displaced locations therealong to ensure consistent spacing between said plurality of hoses;

(b) means connected to said arrangement for detecting a change in pressure of said fluid filling said hoses in response to transfer of the weight of the person onto said hose and to said fluid therein by compression of said hose; and (c) an alarm device connected to said detecting means for generating a warning signal in response to detection of said change in said fluid pressure in said hose by said detecting means;

(d) said arrangement also including a manifold connected in communication with each of a pair of opposite ends of said flexible hoses to ensure the pressure remains substantially the same in all of said hoses and to ensure any change in said pressure in any particular said hose would be transferred through said manifold to said detecting means.

7. The system of claim 6 wherein said detecting means contains a pressure sensing device for sensing an increase in pressure in said hose due to a person stepping thereon, said pressure sensing device including an air tight chamber and a pressure sensor connected in communication therewith by a pressure sensing hole through which compressed air passes to said pressure sensor to detect an increase in pressure in said fluid caused by an increase in pressure in said fluid due to the person stepping on said hose.

8. A protective alarm system for encompassing an area to be protected, said alarm system comprising:

(a) an arrangement including at least one flexible hose filled with fluid and substantially surrounding a perimeter of the area to be protected so as to permit a person approaching the area surrounded by said hose to step on said hose and cause compression of said hose;

(b) means connected to said arrangement for detecting a change in pressure of said fluid filling said hose in response to transfer of the weight of the person onto said hose and to said fluid therein by compression of said hose; and (c) an alarm device connected to said detecting means for generating a warning signal in response to detection of said change in said fluid pressure in said hose by said detecting means;

(d) said detecting means including means for distinguishing between different rates of change and different levels of the pressure of fluid in said hose, said distinguishing means including (i) a plate supported upright on a top surface of the liquid within a tube connected to said hose, said plate having a plurality of holes defined through a central portion thereof adapted to pass light and being solid at upper and lower end portions thereof adapted to block light, and (ii) a pair of light emitting and light sensing devices respectively disposed on opposite sides of said plate and facing toward one another with said plate positioned therebetween such that the amount of light sensed by said light sensing device is dependent upon the position of said plate relative to said light emitting and light sensing devices and the rate of change in the amount of light sensed by said light sensing device is dependent upon rate of change of and the level of the liquid in said tube.

9. The system of claim 8 wherein said holes in said plate are spaced from one another at distances being short enough such that at least part of the light generated by said light emitting device is received by said light sensing device at all times when said central portion of said plate is aligned between said devices.

10. The system of claim 8 wherein said holes in said plate are smaller in size than active areas of said light emitting and sensing devices.

11. A protective alarm system for encompassing an area to be protected, said alarm system comprising:

(a) an arrangement including a plurality of flexible hose modules filled with fluid and interconnected in an end-to-end relationship with one another at opposite open ends of said hose modules such that the fluid filling each hose module communicates with the fluid filling adjacent hose modules interconnected thereto and the interconnected hose modules substantially surround a perimeter of the area to be protected so as to permit a person approaching the area surrounded by said interconnected hose modules to step thereon;

(b) means connected to said arrangement for detecting a change in pressure of said fluid filling said hose modules in response to transfer of the weight of the person onto at least one of said hose modules and to said fluid therein by compression of said hose module; and (c) an alarm device connected to said detecting means for generating a warning signal in response to detection of said change in said fluid pressure in said hose modules by said detecting means;

(d) said detecting means including means for distinguishing between different rates of change and different levels of the pressure of fluid in said hose, said distinguishing means including;

(i) a plate supported upright on a top surface of the liquid within a tube connected to said hose, said plate having a plurality of holes defined there through a central portion thereof adapted to pass light and being solid at upper and lower end portions thereof adapted to block light, and (ii) a pair of light emitting and light sensing devices respectively disposed on opposite sides of said plate and facing toward one another with said plate positioned therebetween such that the amount of light sensed by said light sensing device is dependent upon the position of said plate relative to said light emitting and light sensing devices and the rate of change in the amount of light sensed by said light sensing device is dependent upon the rate of change of the pressure and the level of the liquid in said tube.

12. The system of claim 11 wherein said holes in said plate are spaced from one another at distances being short enough such that at least part of the light generated by said light emitting device is received by said light sensing device at all times when said central portion of said plate is aligned between said devices.

13. The system of claim 11 wherein said holes in said plate are smaller in size than active areas of said light emitting and sensing devices.

* * * * *